United States Patent [19]

Werner

[11] Patent Number: 5,606,899

[45] Date of Patent: Mar. 4, 1997

[54] CLAMPING DEVICE

[76] Inventor: Heinz A. Werner, Edmund-Richen-Str.30, 50765 Köln, Germany

[21] Appl. No.: 197,954

[22] Filed: Feb. 17, 1994

[30] Foreign Application Priority Data

Feb. 19, 1993 [EP] European Pat. Off. .............. 93102592

[51] Int. Cl.$^6$ .................................................. B23B 29/06
[52] U.S. Cl. .................................................. 82/158
[58] Field of Search ........................... 82/158, 160, 161; 29/52; 407/46, 50, 109

[56] References Cited

U.S. PATENT DOCUMENTS 3,433,104  3/1969  Milewski et al. ...................... 82/158

FOREIGN PATENT DOCUMENTS 0423426  6/1990  European Pat. Off. ........ B23B 21/00

*Primary Examiner*—M. Rachuba
*Assistant Examiner*—Kenneth J. Hansen

[57] ABSTRACT

A clamping device for the cutting tools of machine tools having a tool block which can be affixed by clamping elements to the clamping plate of a machine tool carriage, or the like, and which has first guidance means which cooperates with second guidance means of the clamping plate. To prevent bending moments in the tool block and the clamping plate, as well as high surface pressures between the tool block and the clamping plate due to high clamping forces, while still making precise guidance possible, the tool block and the clamping plate have flat clamping surfaces and one of the guidance means is connected to the tool block or to the clamping plate, respectively, so as to be moveable transversely to the clamping surfaces, but immoveable parallel to the clamping surfaces. This ensures that the guidance means always mate without free play, but do not transmit clamping forces.

7 Claims, 2 Drawing Sheets

CLAMPING DEVICE

BACKGROUND OF THE INVENTION

The invention relates to a clamping device, particularly for the cutting tools of machine tools, having a tool block which can be affixed by clamping means to the clamping plate of a tool carriage or the like, and which has first guidance means that cooperates with second guidance means of the clamping plate.

Such clamping devices are known and serve, for example, to quickly and easily exchange or set the cutting tools of automatic lathes and to clamp these accurately in position.

For setting a tool attached to the tool block, clamping devices are generally provided with two or more parallel guide rails mounted on the clamping plate, on which the tool block is slidably displaceable via guidance grooves. To clamp the tool block in place, there are generally used one or more T-head bolts, which extend through the tool block and are screwed tight by nuts. The T-head bolts are slidably located between the guide rails in the clamping plate.

This arrangement has the drawback that the guide rails, in addition to guiding the tool block, also provide the bearing surfaces for transmitting the forces created by the clamping and the cutting. Because clamping forces are exerted between the bearing surfaces of the tool block, there arise substantial bending moments, which lead to deformation of the block, of the clamping plate, and of the underlying tool carriage, and therefore to undesired changes in its guidance system.

A further drawback of this arrangement is that the specific surface pressures between the guide rails and the tool block are very high during clamping.

To prevent bending moments of the tool block and high surface pressures between the block and the guidance track, it is also known to provide the tool block with a shaped clamping surface which, together with a correspondingly-shaped clamping surface of the clamping plate, provides a guide for the setting of the tool block. When clamped, the block then bears uniformly over its whole clamping surface against the clamping plate, so that the clamping forces are evenly distributed and there occur no deformations of the tool block and no high surface pressures between the clamping surfaces of the tool block and the clamping plate.

However, this arrangement has the drawback that the clamping surfaces of the tool block and of the clamping plate have to be manufactured with exceptionally high precision in order to fit well together, because otherwise there is not achieved complete freedom from "play" between the two machine tool components, or else the tool block's clamping surface cannot bear fully against the clamping plate so that undesirable, high surface pressures between the clamping surfaces are again encountered. In addition, these clamping surfaces must always be cleaned exceptionally thoroughly.

BRIEF DESCRIPTION OF THE INVENTION

It is an object of the invention to overcome the drawbacks described above and to provide a clamping device of this type, particularly for the cutting tools of machine tools, in a manner which permits precise and play-free guidance even with ordinary manufacturing precision, which is convenient to clean, and whose tool block can be affixed to the clamping plate with low surface pressures without causing deformation of the tool block or the clamping plate due to the clamping or cutting forces.

This object is achieved in accordance with the invention by providing the tool block and the clamping plate with flat clamping surfaces and by connecting the guidance means of the tool block or the clamping plate to the tool block or the clamping plate, respectively, in such manner as to be moveable generally transversely to the clamping surfaces while being immoveable parallel to these clamping surfaces.

This arrangement has the advantage that the clamping and cutting forces are transmitted to the clamping plate only via the flat clamping surface of the tool block, whereby only low surface pressures can arise between the tool block and the clamping plate, even when high forces are being transmitted. Because the tool block of the clamping device lies flat upon the clamping plate, deformations of the tool block or of the clamping plate due to clamping forces and moments can also not occur. The guidance means cannot transmit clamping or cutting forces, but they can transmit sliding forces because one of the guidance means is moveable transversely to the clamping surface. Therefore, they serve only to guide the tool block in one direction, e.g., when the tool block is newly set after a tool change.

It is particularly advantageous that the moveable guidance means should bear against the tool block or the clamping plate via a spring element. This ensures that the moveable guidance means always mates accurately with the other guidance means after the clamping elements are loosened, thereby enabling precise and play-free positioning of the tool block on the clamping plate. When clamping the tool block to the clamping plate, the guidance means need only absorb the spring forces created by deformation of the spring element.

One guidance means is preferably a rail having generally semicircular cross-section and the other guidance means is a groove which conforms to the rail. It is also possible to give the rail a trapezoidal cross-section which narrows in the direction of the other guidance means, while the other guidance means is a matching groove. Such cross-sections enable highly precise guidance and accurate positioning of the tool block on the clamping plate.

It is particularly advantageous that the spring element be a leaf spring which is attached at one end to the tool block and on which the first guidance means is mounted. Such an arrangement can be manufactured easily, accurately and at low cost and yet be also very sturdy.

The tool block can have an adjustable stop for the first guidance means. The stop can be, for example, a set screw which is screwed through the tool block and whose free end provides the stop for the first guidance means, or for the spring element which supports it. This ensures that, during clamping of the tool block, the spring element is deformed only within its elastic range and springs back to its original position upon clamp release.

If the stop element is a set screw, then it is particularly advantageous to provide at its end which faces the moveable guidance means a resilient body having a force-exerting element. This resilient body then bears against the set screw and urges the force-exerting element continuously against the moveable guidance means. This additional resilient force further raises the pressure with which the moveable guidance means is urged against the stationary guidance means. When the tool block is clamped to the clamping plate, the resilient body, which may be a stack of concave springs sometimes referred to as Belleville washers, can be compressed to its deformation limit, thereby creating a definite stop for the moveable guidance means.

The first guidance means can have an adjusting device which may appropriately consist of a clamping screw which extends through the tool block and which is screwed to the first guidance means or its supporting leaf spring. Such an adjusting device makes it possible to compensate for inaccuracies in the desired position of the guidance means arising during manufacturing, e.g., during annealing, and to establish the first guidance means in its precise position relative to the second guidance means of the clamping plate as necessary for the accurate positioning of the tool block.

Additional features and advantages of the invention will appear from the description which follows and from the drawings in which examples of preferred embodiments of the invention are more fully explained.

DETAILED DESCRIPTION OF THE PREFERRED EMBODIMENTS

Figure 1:
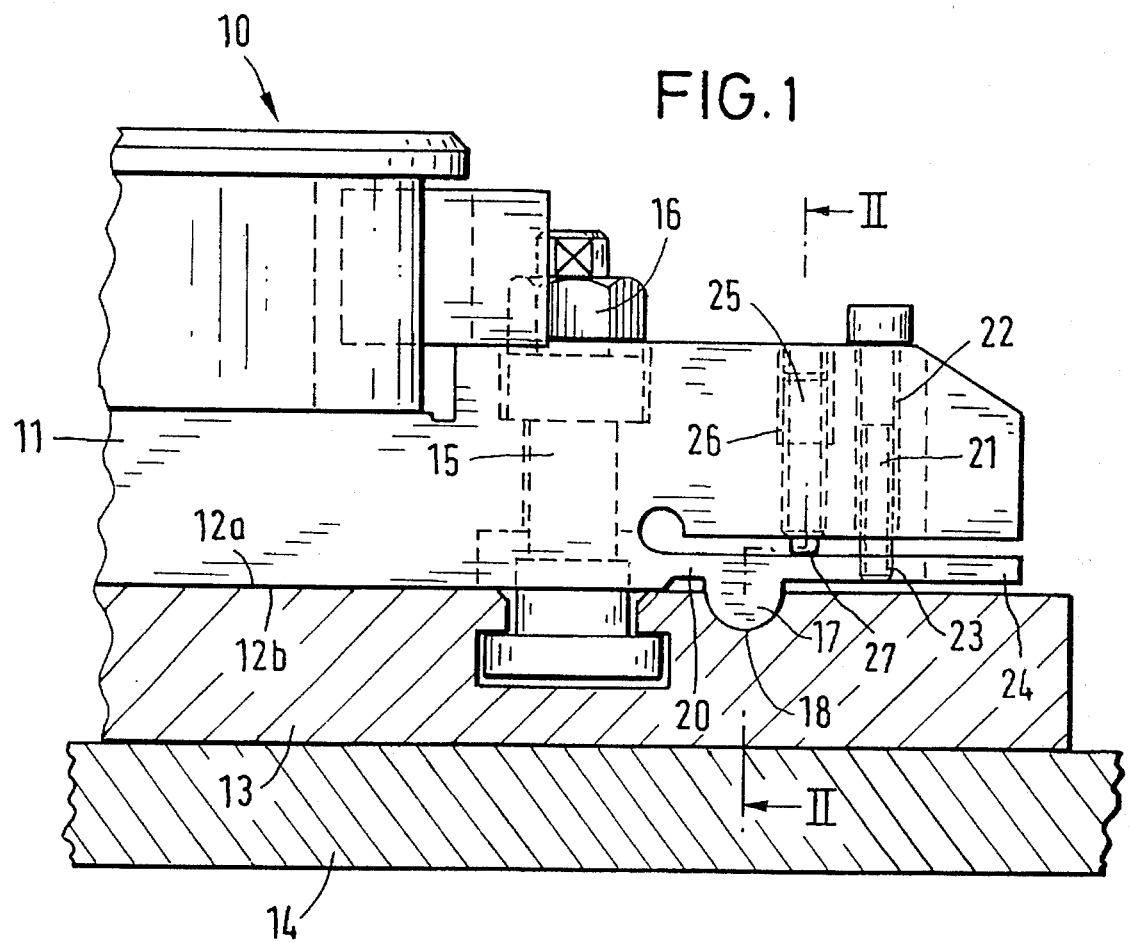
FIG. 1 shows, partly in cross-section, the clamping device of the invention viewed in the adjusting direction of the tool block.

In the drawings, reference numeral 10 designates a clamping device for the quick-change tool holder of a machine tool, e.g., an automatic lathe.

The clamping device 10 consists essentially of a tool block 11 having a generally rectangular base, and which has a lower, flat clamping surface 12a that lies flat against the upper clamping surface 12b of clamping plate 13. In the embodiment illustrated, the clamping plate 13 is a base plate which is attached to a machine tool carriage in a manner not further illustrated. However, it is also possible for the machine tool carriage 14 itself to constitute the clamping plate 13.

To fix it in position on clamping plate 13, the tool block 11 has T-head bolts 15 which are screwed together with nuts 16 and which force the tool block 11 against the clamping plate 13 when tightened. Even at high clamping forces exerted by bolts 15, the surface pressures between clamping surfaces 12a, b of tool block 11 and clamping plate 13 remain low.

The tool block 11 further has, as the first guidance means, a guide rail 17 which cooperates with a groove 18 in clamping plate 13 forming the second guidance means in order to accurately guide the tool block 11 during adjustment of its position lengthwise with respect to clamping plate 13.

Figure 2:
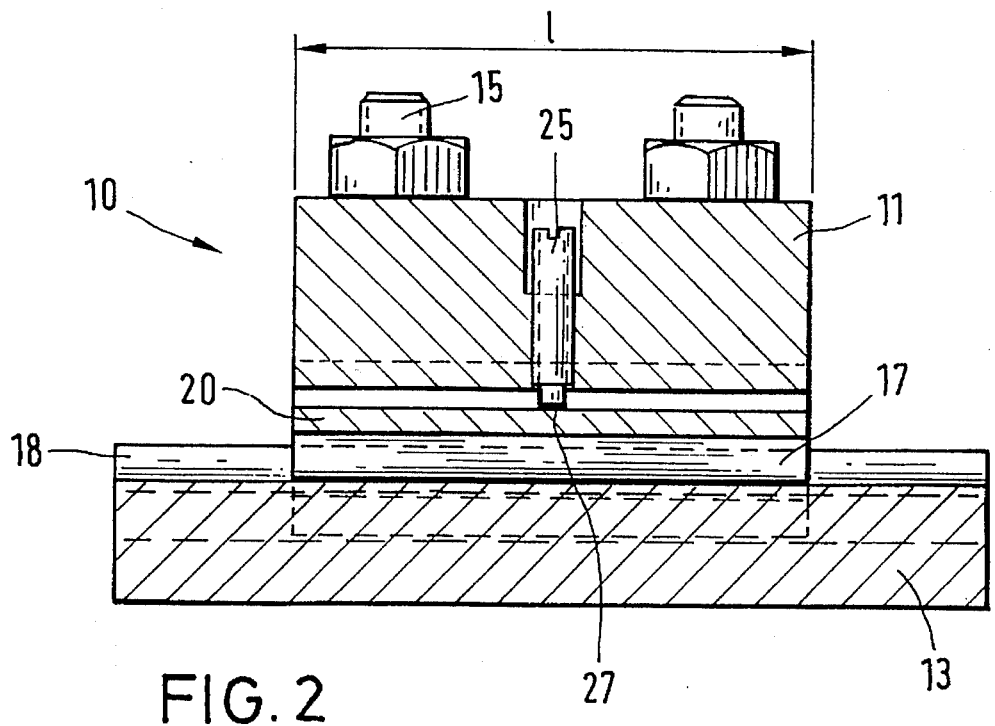
FIG. 2 is a cross-sectional view of the device of FIG. 1 taken along line 11—11.

The guide rail 17 shown in FIGS. 1 and 2 has a generally semicircular cross-section and is formed on a leaf spring 20 which extends along the length l of the tool block 11, to which it is attached at one end. The rail engages, without play, the generally semicircular groove 18 in the clamping plate 13 and thereby makes possible the accurate guidance of clamping block 11 in the lengthwise direction of groove 18 in clamping plate 13, when clamping bolts 15 are loosened.

When clamping the tool block 11 against clamping plate 13 through tightening of nuts 16, the rail 17 can yield upwardly, transversely to clamping surface 12a against the restoring force of leaf spring 20, which is thereby elastically flexed in the vicinity of its attachment to tool block 11. After loosening of the clamping nuts, leaf spring 20 continuously urges rail 17 into the trough-shaped guidance groove 18, thereby assuring play-free sliding guidance of tool block 11 upon clamping plate 13.

To prevent the rail 17 from being pressed by leaf spring 20 into guidance groove 18 so forcefully that the tool block 11 is lifted too far above clamping plate 13 when the tightening nuts 16 are loosened, the rail 17 is provided with an adjusting device consisting of set screw 21 which extends through a passage 22 in tool block 11 and which is screwed into a threaded recess 23 at the free end 24 of leaf spring 20. This set screw 21 makes it possible to limit the maximum displacement of leaf spring 20 in the direction of the clamping plate 13. In addition, this makes it possible to compensate for manufacturing tolerances which may arise during production of the clamping device, e.g., through annealing of the spring.

The clamping device 10 has a self-locking set screw 25 which is screwed into a threaded passage 26 in the tool block 11 and whose lower end forms a stop 27 for leaf spring 20.

Figure 3:
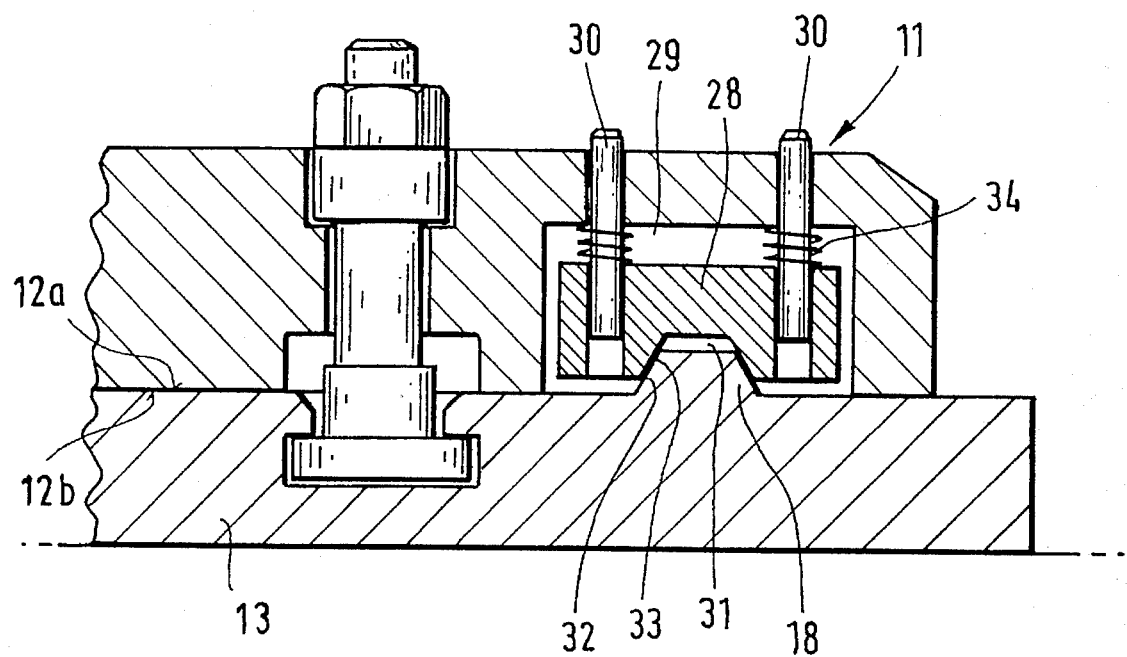
FIG. 3 shows another embodiment of the invention in a view corresponding to that of FIG. 1.
Figure 4:
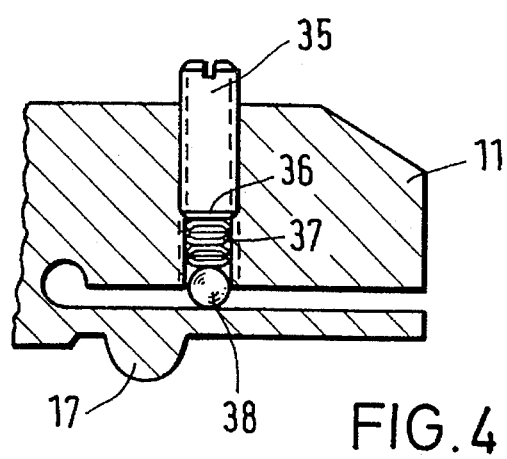
FIG. 4 illustrates additional details of the embodiment of FIG. 1.

FIG. 3 shows a further embodiment of the tool clamping device 10. The first guidance means 17 consists of a guidance element 28 which is moveable transversely to clamping surfaces 12a, b and which is guided in a recess 29 in tool block 11 by means of pins 30. On its underside, guidance element 28 has a trapezoidal groove 31 which extends over the length l of the tool block 11, whose sloping side surfaces 32 bear against guide surfaces 33 of guide rail 18, which is also trapezoidal, and which constitutes the second guidance means, thereby making possible the precise and play-free guidance of tool block 11. In this arrangement, the guidance element 28 is urged against guide rail 18 by coil springs 34 which encircle pins 30 and which bear against tool block 11 at one end and against guidance element 28 at the other.

FIG, 4 shows a further embodiment of the stop element according to FIG. 1. This stop element 25 consists of a set screw 35 whose lower end 36 abuts against a spring body 37 of concave springs, sometimes referred to as Belleville washers, which urge a ball bearing 38 against the moveable guidance means 17. By adjusting set screw 35, the compression of spring body 37 can be adjusted, whereby the bearing pressure of the first guidance means against the second can be varied. When tool block 11 is clamped to clamping plate 13, rail 17 is displa upwardly and fully compresses spring body 37, thereby providing a firm stop for the moveable guidance means.

The invention is not limited to the embodiments which have been described, but there also exist numerous possible modifications without departing from the inventive concept. For example, it is possible to guide the tool block with two or more first guidance means and corresponding second guidance means located on the clamping plate. The guide rail can also have a different cross-section, e.g., that of a polygon.

What is claimed is:

1. A clamping device for a machine tool, said machine tool having a tool block and a clamping plate to which the tool block is adapted to be affixed by means of at least one tightening bolt, said clamping device having first guidance means on the tool block, and second guidance means on the clamping plate which cooperates with said first guidance means, characterized in that the tool block and the clamping plate each have a clamping surface with an opening for the passage of said at least one tightening bolt, said clamping surfaces being flat overall except at said bolt openings and at said guidance means;

the first guidance means on the tool block or the second guidance means on the clamping plate is connected to the tool block or the clamping plate respectively so as to be moveable perpendicularly to the flat clamping surfaces, but immoveable in a first transverse direction parallel to the flat clamping surfaces wherein the tool block or the clamping plate is adapted to slide in a second transverse direction normal to the first transverse direction;

the first guidance means is a rail and the second guidance means is a groove conforming to the rail;

at least one spring element which resiliently urges the moveable one of said first or second guidance means into engagement with the immoveable one of said guidance means: and the at least one spring element is a leaf spring which projects from one end to the tool block and on which the rail is mounted.

2. The device of claim 1 characterized in that the first guidance means is a rail of generally semicircular cross-section and the second guidance means is a groove conforming to the rail.

3. The device of claim 1 characterized in that the tool block is provided with an adjustable stop element for the leaf spring which limits deformation of the leaf spring to its elastic range.

4. The device of claim 3 characterized in that the adjustable stop element is a set screw whose end facing the leaf spring is provided with a spring body and a pressure-applying element.

5. The device of claim 1, characterized in that the leaf spring is provided with adjusting means.

6. The device of claim 1 characterized in that the leaf spring is provided with adjusting means, and the adjusting means consists of a clamping screw which extends through the tool block and which is screwed to the leaf spring to limit the maximum displacement of the rail toward the groove.

7. The device of claim 1 characterized in that the tool block is provided with an adjustable stop element for the leaf spring.

* * * * *

UNITED STATES PATENT AND TRADEMARK OFFICE
CERTIFICATE OF CORRECTION

PATENT NO. : 5,606,899
DATED : March 4, 1997
INVENTOR(S) : Heinz A. Werner

It is certified that error appears in the above-identified patent and that said Letters Patent is hereby corrected as shown below:

On the cover page of the patent, the Assignment data should be included as follows:

Item [73]   Assignee:   Alfred H. Schütte Werkzeugmaschinenfabrik GmbH & Co.
Köln-Poll GERMANY Signed and Sealed this Twenty-sixth Day of August, 1997

*Attest:*

BRUCE LEHMAN

*Attesting Officer*   *Commissioner of Patents and Trademarks*